(12) United States Patent
Coumoyer et al.

(10) Patent No.: US 7,431,248 B2
(45) Date of Patent: Oct. 7, 2008

(54) DEVICE FOR ADJUSTING THE ATTITUDE OF AN OBJECT

(76) Inventors: Steeve Coumoyer, 908 Beatrice, St-Joseph de Sorel (CA) J3R 3E8; Marcel Cormier, 306, Chemin des Patriches #3, Sorel-Tracy (CA) J3P 2L8; Eric Mailloux, 161, rua Rol, Sorel-Tracy (CA) J3P 4N4

( * ) Notice: Subject to any disclaimer, the term of this patent is extended or adjusted under 35 U.S.C. 154(b) by 216 days.

(21) Appl. No.: 11/356,068

(22) Filed: Feb. 17, 2006

(65) Prior Publication Data

US 2006/0180720 A1 Aug. 17, 2006

Related U.S. Application Data

(60) Provisional application No. 60/653,509, filed on Feb. 17, 2005.

(51) Int. Cl.
*F16M 11/24* (2006.01)
(52) U.S. Cl. ............... 248/188.2; 248/649; 248/651; 248/677
(58) Field of Classification Search ......... 248/500, 248/188.2, 188.3, 188.5, 678, 688, 354.6, 248/669, 649, 648, 651, 660, 910, 677; 108/147, 108/144, 106
See application file for complete search history.

(56) References Cited

U.S. PATENT DOCUMENTS

| 3,191,954 | A | * | 6/1965 | Schuetz | 280/6.153 |
| 4,257,618 | A | * | 3/1981 | Tax et al. | 280/6.155 |
| 4,637,581 | A | * | 1/1987 | Wong | 248/188.3 |
| 6,009,815 | A | * | 1/2000 | Hartman | 108/147 |
| RE39,477 | E | * | 1/2007 | Nellers et al. | 280/754 |

* cited by examiner

*Primary Examiner*—Korie H. Chan

(57) ABSTRACT

An attitude adjustment system for supporting an object and allowing an adjustment of the attitude thereof. The system includes a distributor defining a distributor chamber therewithin. The distributor also has a distributor external surface. The distributor further defines a plurality of distributor apertures extending from the external surface to the distributor chamber. A valve is provided, at least in part, within the distributor chamber for selectively interconnecting the distributor apertures and isolating the distributor apertures from each other. The system further includes a plurality of supports for supporting the object. Each support includes a sleeve defining a support chamber therewithin, and having a support external surface. The sleeve further defines first and second sleeve apertures extending from the support external surface to the support chamber. Each support further includes a piston extending through, and obstructing the first sleeve aperture. The second sleeve aperture of each support is in fluid communication with a respective distributor aperture.

15 Claims, 12 Drawing Sheets

DEVICE FOR ADJUSTING THE ATTITUDE OF AN OBJECT

This application claims priority from U.S. Provisional Patent Application Ser. No. 60/653,509 filed Feb. 17, 2005.

FIELD OF THE INVENTION

The present invention relates to the general field of supports for objects, and is particularly concerned with a device for adjusting the attitude of an object.

BACKGROUND OF THE INVENTION

There are many devices that need to be leveled or otherwise oriented when in use, or prior to being used. For example, surfaces such as tabletops and pool table tops typically need to be substantially parallel to the ground onto which they are located. Also, many appliances such as clothes washers and dryers, stoves and refrigerators, among others, also need to be leveled prior to being used.

Currently existing systems for adjusting the attitude of an object generally fall into two categories. In the first category, such a system is mechanical and includes, for example, a plurality of legs that are selectively screwed into or out from the object so as to adjust the attitude of the object. Many other mechanical variants exist into which one or more legs that support an object are adjusted in length to vary the attitude of the object. There also exist mechanical systems that interconnect two such legs so that the object is self-levelling.

In most currently existing levelling systems, the adjustment of the attitude of the object is relatively hard to perform. Typically, there is a need to proceed through trial and error to find the position of the legs that provide a substantially level surface. Also, the legs are typically located under the object and are therefore relatively hard to access and may also be relatively hard to operate if the object is heavy.

In a second category, a levelling system includes a hydraulic subsystem wherein a pump pumps a liquid between pistons located within the legs of the object. These systems typically include pistons mounted into respective sleeves for reciprocating movement relatively thereto. Each piston and its respective sleeve together define two chambers, each located adjacent opposed ends of the piston. Forcing a fluid into one of the chambers pushes the piston towards the other chamber, which in turn forces the fluid out from this other chamber. There is therefore a need to have a source of positive pressure in such systems, which is typically the above-mentioned pump. While such systems are more convenient to operate than most mechanical systems, they are also relatively complex, relatively expensive and relatively prone to failure.

Against this background, there exists a need in the industry to provide an improved device for adjusting the attitude of an object.

An object of the present invention is therefore to provide an improved device for adjusting the attitude of an object.

SUMMARY OF THE INVENTION

In a broad aspect, the invention provides a device for adjusting the attitude of an object and supporting the object onto a ground surface. The device is usable with a fluid and includes:

at least two supports, each support being provided for supporting at least in part the object, each support including a sleeve; a piston mounted for reciprocal movement within the sleeve so as to be movable between a retracted position and an extended position; the sleeve and the piston together defining a support chamber, the support chamber being fillable with the fluid, the support chamber defining a support chamber volume, the support chamber volume being larger when the piston is in the extended position than when the piston is in the retracted position; at least one of the sleeve and the piston defining a ground contacting surface for supporting the support onto the ground surface; and a primary valve in fluid communication with the at least two supports, the primary valve being operable between an open configuration and a closed configuration, wherein in the open configuration, the valve allows the fluid to flow between the at least two supports through the valve and in the closed configuration, the valve prevents the fluid to move between the at least two supports through said valve.

Advantageously, the device is relatively simple, relatively easy to manufacture and relatively inexpensive. Also, the device is relatively easy to operate and is suitable for objects having a weight included within a relatively large interval.

In some embodiments of the invention, the device automatically biases all the ground contacting surface onto the ground. In these embodiments, simply operating the valve to the open configuration and subsequently to the closed configuration ensures that all the supports contact the ground. Therefore, the device allows to easily ensure that all ground contacting surface contact the ground and that the object is therefore stable onto the ground surface, even in cases wherein the ground surface is uneven.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
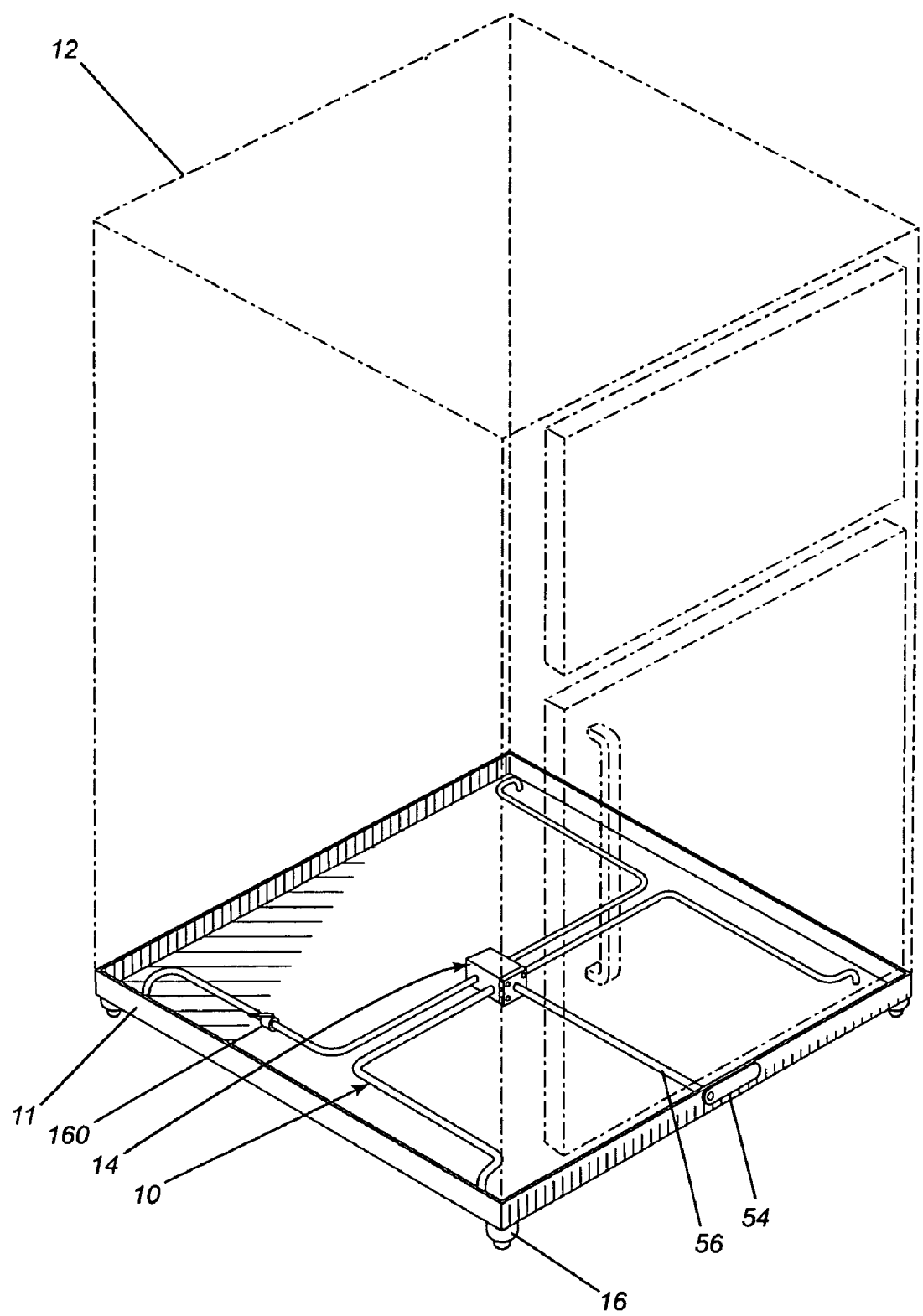
FIG. 1, in a perspective view, illustrates a device for adjusting the attitude of an object in accordance with an embodiment of the invention, the object being shown in phantom lines and supported by the device.

FIG. 1 illustrates a device 10 for adjusting the attitude of an object 12 and supporting the object 12 onto a ground surface (not shown in the drawings). In the drawings, the object 12 is a refrigerator. However, it is within the scope of the invention to support any other suitable object. For example, objects that are supportable by the device 10 include alternative appliances, such as stoves, dryers and washing machines, tables, workbenches, and any other objects supported onto a ground through a plurality of supports.

In FIG. 1, the device 10 includes a platform 11 for receiving the object 12. However, in alternative embodiments of the invention, the device 10 supports the object 12 in any other suitable manner.

Figure 2:
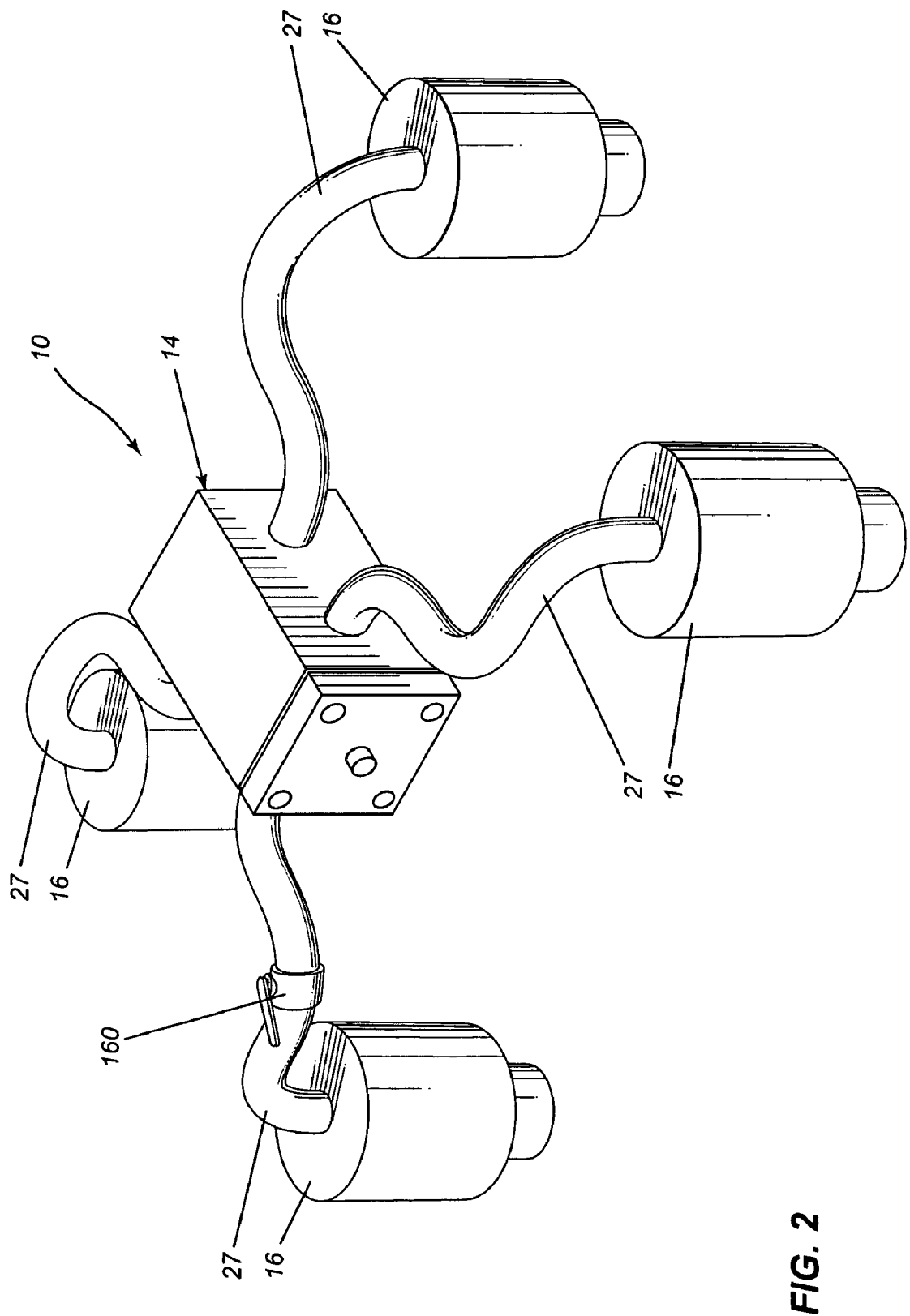
FIG. 2, in a partial perspective view, illustrates the device of FIG. 1.

The device 10 allows for the adjustment of the attitude of the object 12. To that effect, the device 10 includes a primary valve 14 and at least two supports 16, as seen in FIG. 2. The supports 16 are in fluid communication with the primary valve 14. A fluid is provided within the primary valve 14 and within the supports 16.

The primary valve 14 is operable between an open configuration and a closed configuration. When the primary valve 14 is in the open configuration, the primary valve 14 allows the fluid to flow between the at least two supports 16 through the primary valve 14. When the primary valve 14 is in the closed configuration, the primary valve 14 prevents the fluid from moving between the at least two supports 16 through the primary valve 14. In some embodiments of the invention, as shown in the drawings, in the open configuration, the primary valve 14 allows the fluid to flow simultaneously between all the supports 16 to which it is connected.

In other words, in the closed configuration, the supports 16 are prevented from exchanging the fluid therebetween. In this closed configuration, the supports 16 are locked and the attitude of the object 12 is therefore not adjustable. When the primary valve 14 in the open configuration, the primary valve 14 interconnects at least some of the supports 16. In some embodiments of the invention, in the open configuration, the primary valve 14 interconnects all the supports 16. The open configuration allows manipulating the object 12 so as to change its attitude. When the attitude of the object 12 is changed, the fluid flows between the supports 16. This allows adjustment of the attitude of the object 12 through the use of pistons 20, that are provided within the supports 16, as will be described in further details hereinbelow.

FIGS. 2, 3, 4 and 5 illustrate the device 10 with the platform 11 removed for clarity reasons. As better shown in FIG. 3, the device 10 includes the primary valve 14, and the supports 16. A device 10 including four supports 16 is shown in the drawings. However, it is within the scope of the invention to have devices including any other suitable number of supports 16.

The supports 16 are in fluid communication with the primary valve 14 through tubes 27. In some embodiments of the invention, the tubes 27 are permanently attached to the primary valve 14. However, in other embodiments of the invention, the tubes 27 are releasably attached to the primary valve 14. Manners of attaching tubes to other objects, such as valves, are well-known in the art and this aspect of the device 10 will not be further described herein.

The supports 16 each include a respective sleeve 44 and a respective piston 20 mounted for reciprocating movement within the sleeve 44 so as to be movable between a retracted position and an extended position. Each sleeve 44 and its associated piston 20 together define a support chamber 46. Each support chamber 46 is fillable with the fluid and defines a support chamber volume, the support chamber volume being larger when the piston 20 is in the extended position than when the piston 20 is in the retracted position.

Figure 3:
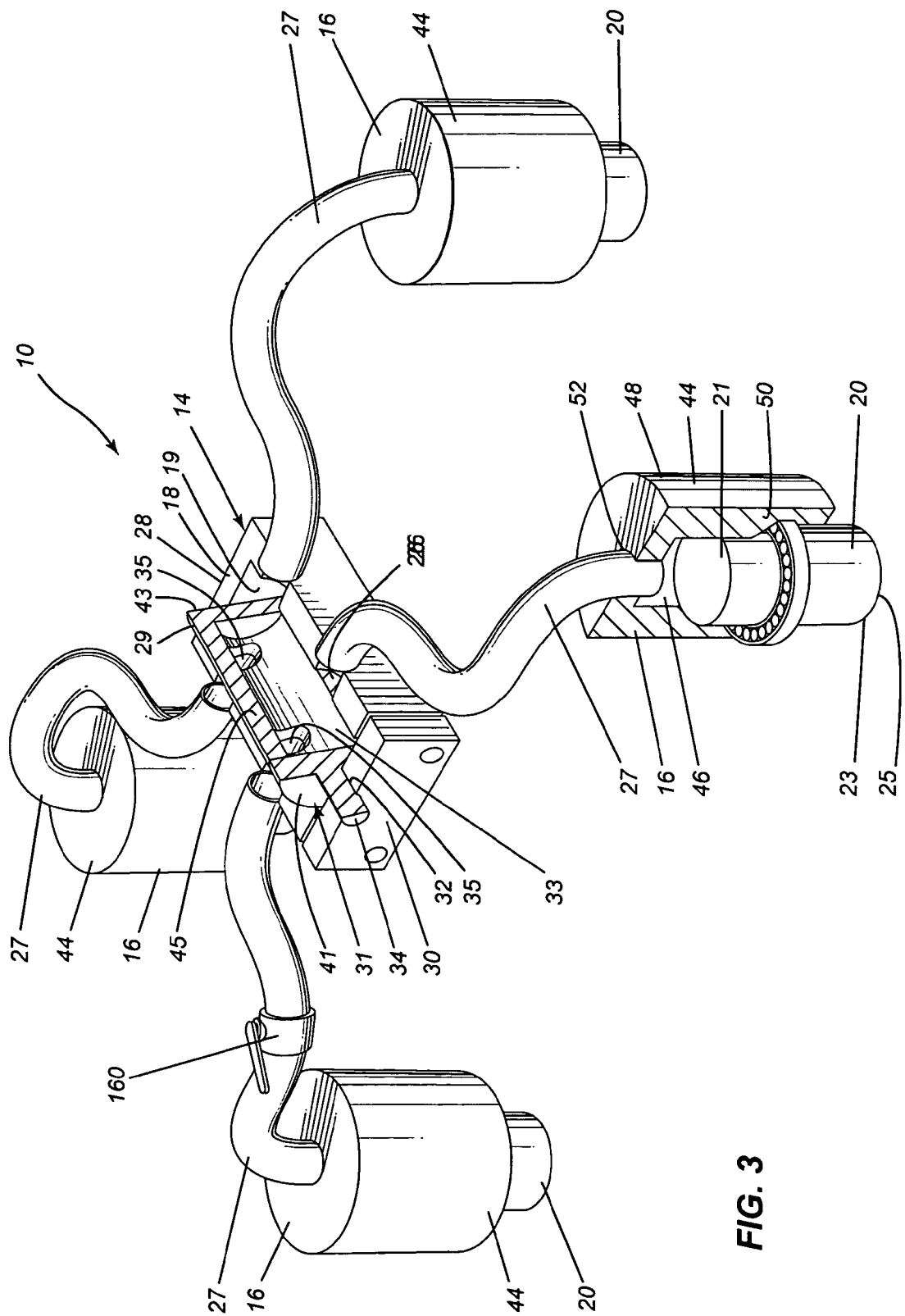
FIG. 3, in a partial perspective cross-sectional view, illustrates the device of FIG. 1 with a valve thereof in an open configuration.

For each support 16, at least one of the sleeve 44 and the piston 20 defines a ground contacting surface for supporting the support 16 onto the ground surface. For example, as seen in FIG. 3, each piston 20 is substantially elongated and defines a piston first end 21 and a substantially longitudinally opposed piston second end 23. The piston first end 21 is insertable into the sleeve 44 and a ground contacting surface 25 located substantially adjacent the piston second end 23. The ground contacting surface 25 is located outside of the sleeve 44.

Each sleeve 44 defines a support external surface 48. Each support chamber 46 receives at least in part a respective piston 20 therewithin. The sleeve 44 further defines first and second sleeve apertures 50 and 52 extending between the support external surface 48 and the support chamber 46.

The piston 20 extends through the first sleeve aperture 50. In addition, the piston 20 substantially obstructs the first sleeve aperture 50. The tubes 27 are connected to the second sleeve aperture 52 and therefore put in fluid communication the second sleeve apertures 52 and the primary valve 14. As shown in the drawings, in some embodiments of the invention, a seal 53 is provided between the piston 20 and the second sleeve aperture 50 so as to seal the support chamber 46.

The primary valve 14 includes a valve body 18 having a valve internal chamber 19, the valve internal chamber 19 being in fluid communication with the support chambers 46. A flow controlling member 29 is mounted into the valve internal chamber 19. The flow controlling member 29 includes a flow controlling member outer surface 31, a flow controlling member chamber 33 located thereinto and flow controlling apertures 35 extending between the flow controlling member outer surface 31 and the flow controlling member chamber 33.

Figure 4:
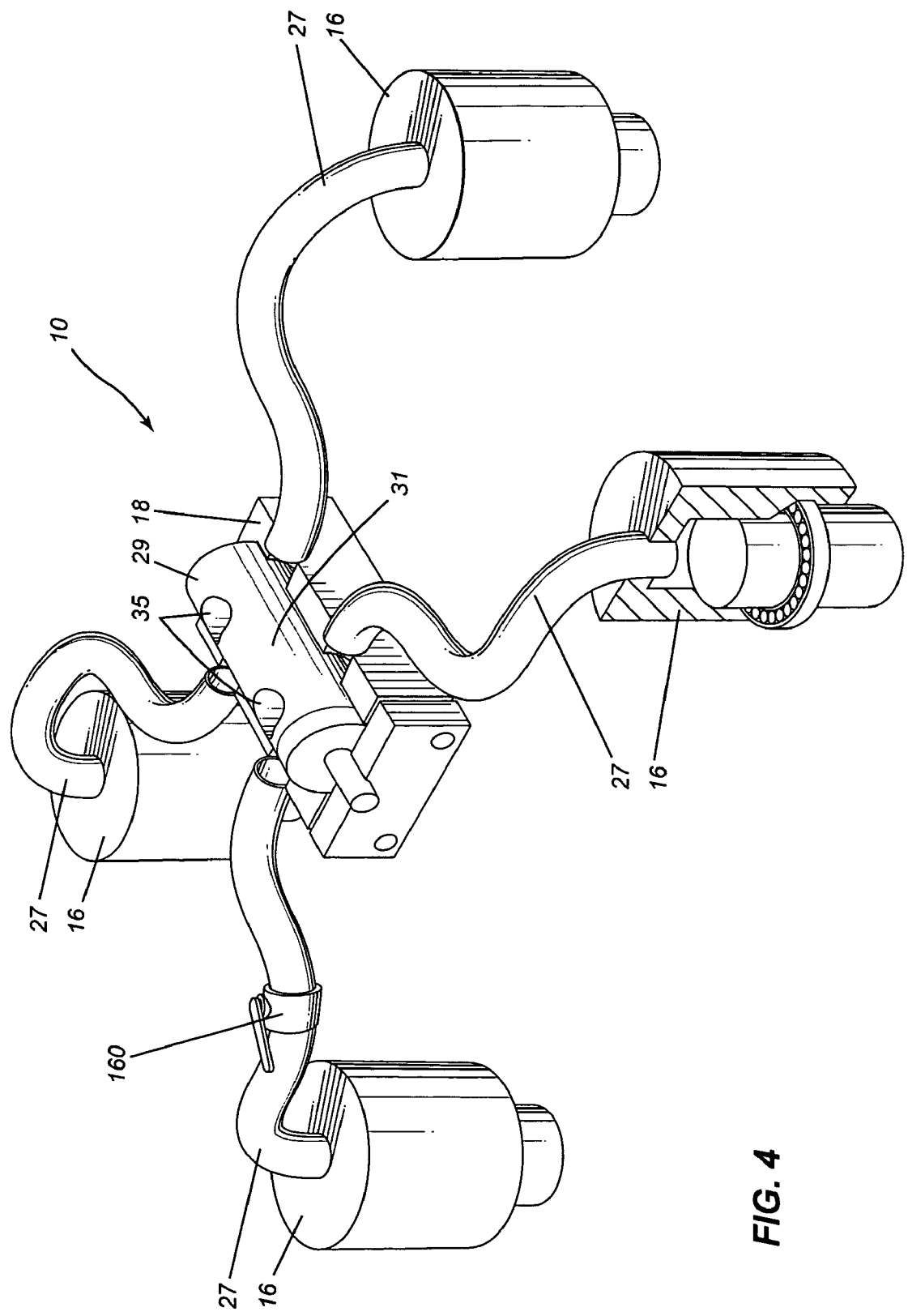
FIG. 4, in a partial perspective cross-sectional view, illustrates the device of FIG. 1 with the valve thereof in a closed configuration.
Figure 5:
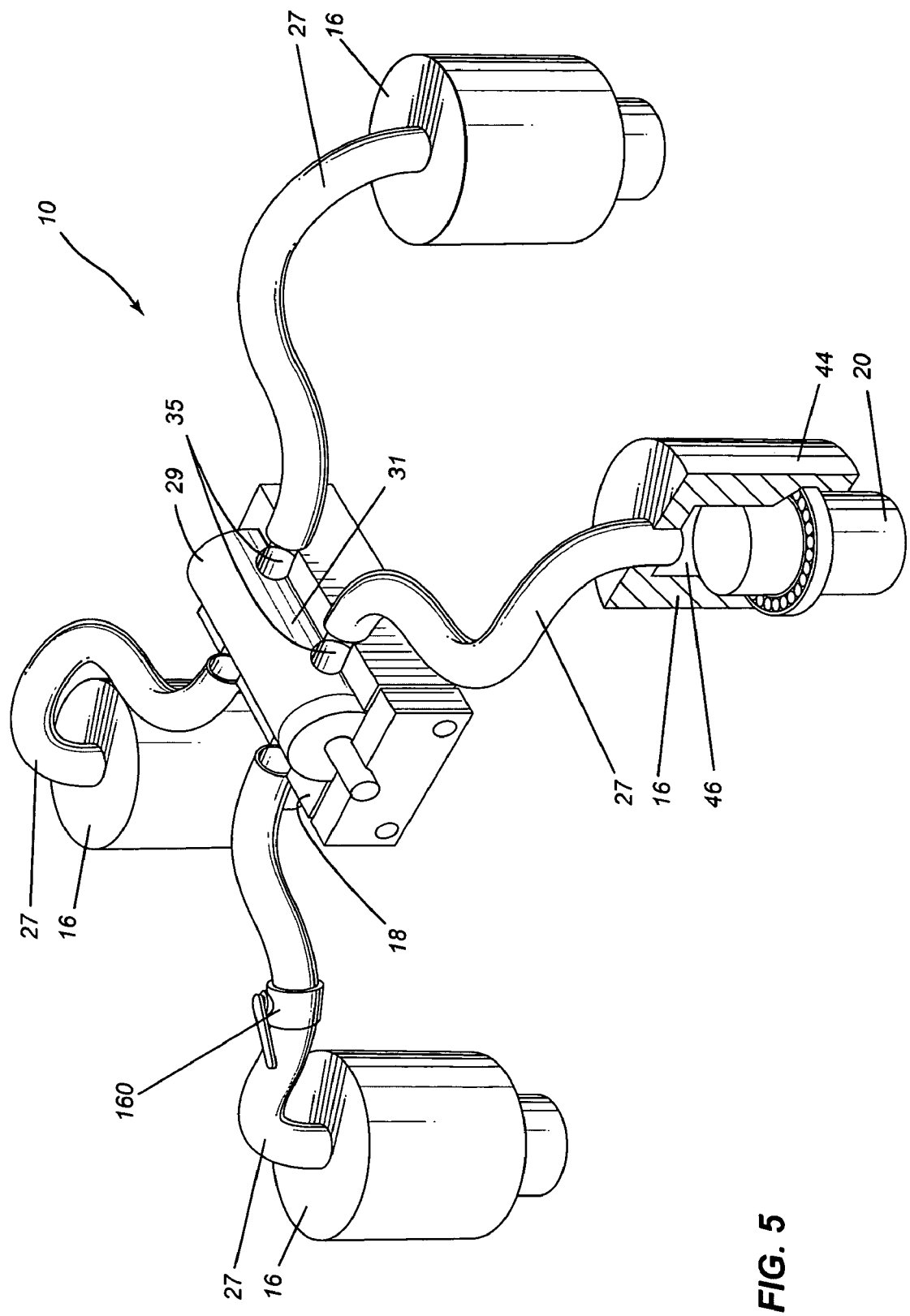
FIG. 5, in an alternative partial perspective cross-sectional view, illustrates the device of FIG. 1 with a valve thereof in the open configuration.

The flow controlling member 29 is movable to an open position, seen in FIGS. 3 and 5 wherein the flow controlling apertures 35 are each in fluid communication with a respective one of the support chambers 46, thereby allowing the fluid to flow into and out from the flow controlling member chamber 29. The flow controlling member 29 is also movable to a closed position, as seen in FIG. 4, in which the flow controlling member 29 prevents the fluid from flowing into and out from the flow controlling member chamber 29 (not seen in FIG. 4).

In some embodiments of the invention, the valve internal chamber 19 is substantially cylindrical and the valve body 18 defines valve body apertures 26 extending substantially outwardly from the valve internal chamber 19, each of the valve body apertures 26 being in fluid communication with a respective one of the support internal chambers 46. The flow controlling member 29 is substantially cylindrical and rotatably mounted into the valve internal chamber 19. The flow controlling member 29 is movable between the open and closed positions through a rotation of the flow controlling member 29 with respect to the valve internal chamber 19.

The valve body apertures 26 and the flow controlling apertures 35 are positioned such that when the flow controlling member 29 is in the open position, each of the flow controlling apertures 35 is substantially in register with a respective one of the valve body apertures 26.

The flow controlling member 29 defines a longitudinal axis and includes a flow controlling member first end wall 41, a flow controlling member second end wall 43 located substantially longitudinally opposed to the flow controlling member first end wall 41, and a flow controlling member peripheral wall 45 extending therebetween.

Referring to FIG. 3, in some embodiments of the invention, the valve body 18 includes a fluid containing member 28 and a lid 30. The lid 30 is removably attached to fluid containing member 28. Removal of the lid 30 from the fluid containing member 28 provides an access to valve internal chamber 19.

The lid 30 defines a lid aperture 32 extending therethrough. A valve actuator 34 extends from the flow controlling member 29 towards the exterior of the primary valve 14 through the lid aperture 32 to allow operation of the primary valve 14 between the closed and the open configurations.

A fluid fills the device 10. In some embodiments of the invention, depending on the fluid, seals, gaskets or any other suitable devices are provided to prevent the fluid from escaping the device 10. Suitable examples of fluids include oil, water and a gas, among others.

Also, while the primary valve 14 shown in the drawings includes four valve body apertures 26, it is within the scope of the invention to have primary valves 14 having any suitable number of valve body apertures 26. Also, it is within the scope of the invention to have primary valves 14 having valve body apertures 26 to which no tube 27 is connected. In these embodiments of the invention, the valve body apertures 26 not connected to a tube 27 are instead blocked by a suitable cap (not shown in the drawings).

Also, the reader skilled in the art will readily appreciate that the shape of the valve body apertures 26, flow controlling apertures 35 and sleeve apertures 50 and 52 is not necessarily circular in all embodiments of the invention.

The valve actuator 34 allows an intended user to relatively easily operate the primary valve 14 between the open and closed configurations. As shown in FIG. 1, an example of such a suitable actuator includes a handle 54 connected through a rod 56 to the primary valve 14, and more specifically to the flow controlling member 29. However, it is within the scope of the invention to have any other suitable actuators including, but not limited to, a motorized actuator.

In use, the object 12 is positioned onto the device 10. At first, the primary valve 14 is in the closed configuration shown in FIG. 4. In this case, the support chambers 46 are not in fluid communication with each other and therefore the pistons 20 are substantially prevented from moving within their respective sleeves 44.

Then, the primary valve 14 is operated to the open configuration shown in FIG. 5. In this configuration, all the support chambers 46 become in fluid communication with each other and therefore can exchange fluid. When the primary valve 14 is in the open configuration, if one or more of the pistons 20 does not contact the ground, a pressure exerted into support chambers 46 for which the piston 20 touches the ground will push the fluid out of these support chambers 46 into the other support chambers for which the piston 20 does not touch the ground. Therefore, within a relatively short time interval, all the pistons 20 touch the ground. This is useful, for example, when the object 12 is a table that is supported on a relatively uneven surface, such as an outdoor surface.

Then, the intended user manipulates the object 12 so as to adjust its attitude. Once a desired attitude has been obtained, the primary valve 14 is operated to the closed configuration, which therefore fixes the attitude of the object 12.

Figure 6:
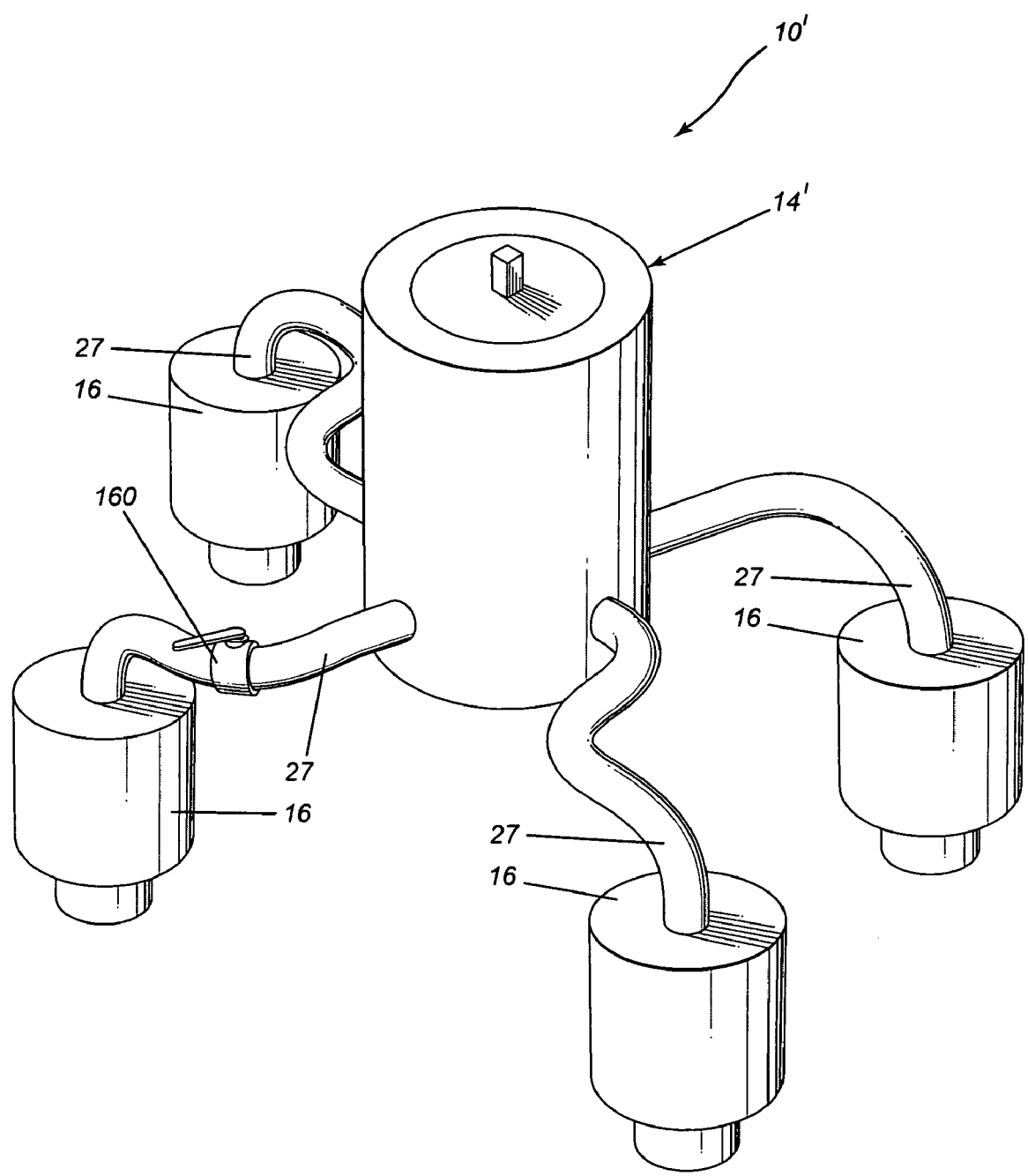
FIG. 6, in a partial perspective view, illustrates a device for adjusting the attitude of an object in accordance with an alternative embodiment of the invention.
Figure 7:
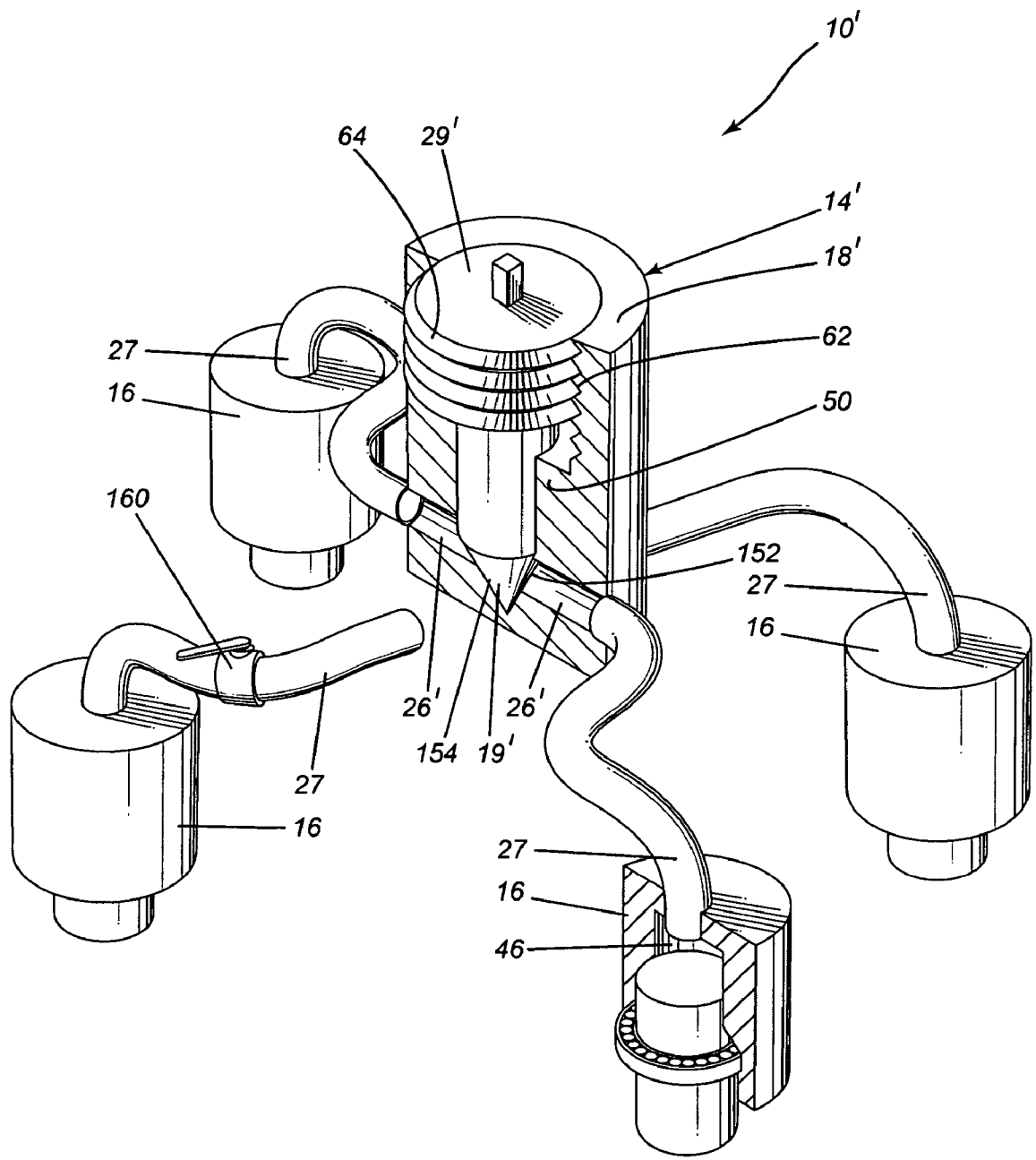
FIG. 7, in a perspective partial cross sectional view, illustrates the device of FIG. 6 with a valve thereof in a closed configuration.
Figure 8:
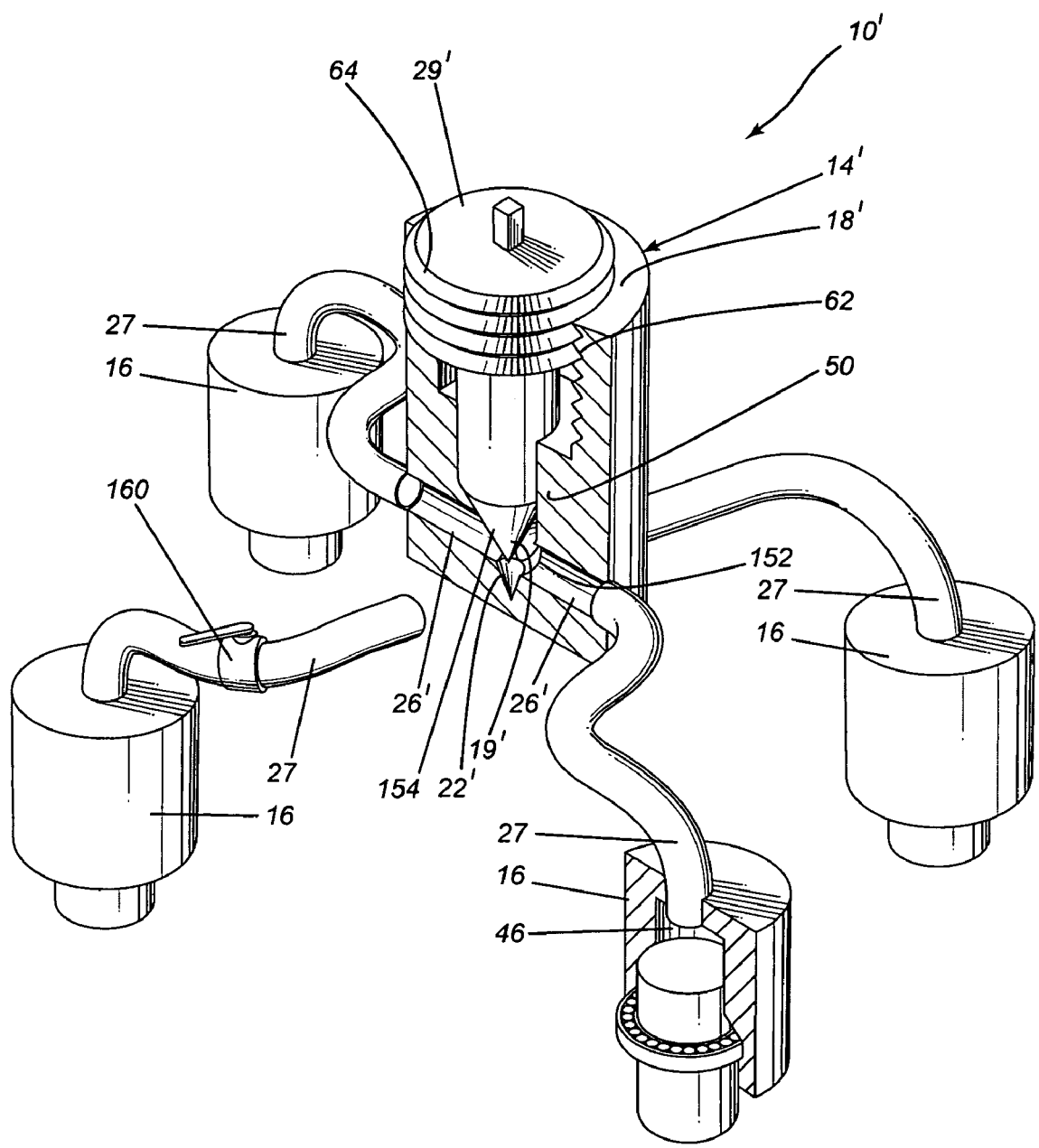
FIG. 8, in a perspective partial cross sectional view, illustrates the device of FIG. 6 with a valve thereof in an open configuration.

FIGS. 6, 7 and 8 illustrate an alternative device 10'. The device 10' is similar to the device 10 except that the device 10' includes an alternative primary valve 14'. The primary valve 14' includes a valve body 18' having a valve internal chamber 19' and valve body apertures 26' extending substantially outwardly therefrom, each of the valve body apertures 26' being in fluid communication with a respective one of the support internal chambers 46.

A flow controlling member 29' is mounted to the valve body 18'. The flow controlling member 29' is movable between an open position (shown in FIG. 8) and a closed position (Shown in FIG. 7). In the open position, the valve body apertures are in fluid communication with the valve internal chamber 19'. In the closed position, the flow controlling member 29' prevents the fluid to flow between the valve body apertures 26' and the valve internal chamber 19'. For example, in the closed position, the flow controlling member 29' substantially fills the valve internal chamber 19'.

The valve body 18' includes a controlling member receiving aperture 50 extending substantially outwardly from said valve internal chamber 19'. The flow controlling member 29' is at least in part mounted into the controlling member receiving aperture 50.

In some embodiments of the invention, the valve body 18' defines valve body threads 62 and the flow controlling member 29' defines controlling member threads 64 engaging at least in part the valve body threads 62. The valve body threads 62 and the flow controlling threads 64 are located such that a rotation of the flow controlling member 29' relatively to the valve body causes the flow controlling member 29' to move relative to the valve internal chamber. More specifically, rotating the flow controlling member 29' causes at least a portion of the flow controlling member 29' to move into and out from the valve body chamber 19'.

Figure 9:
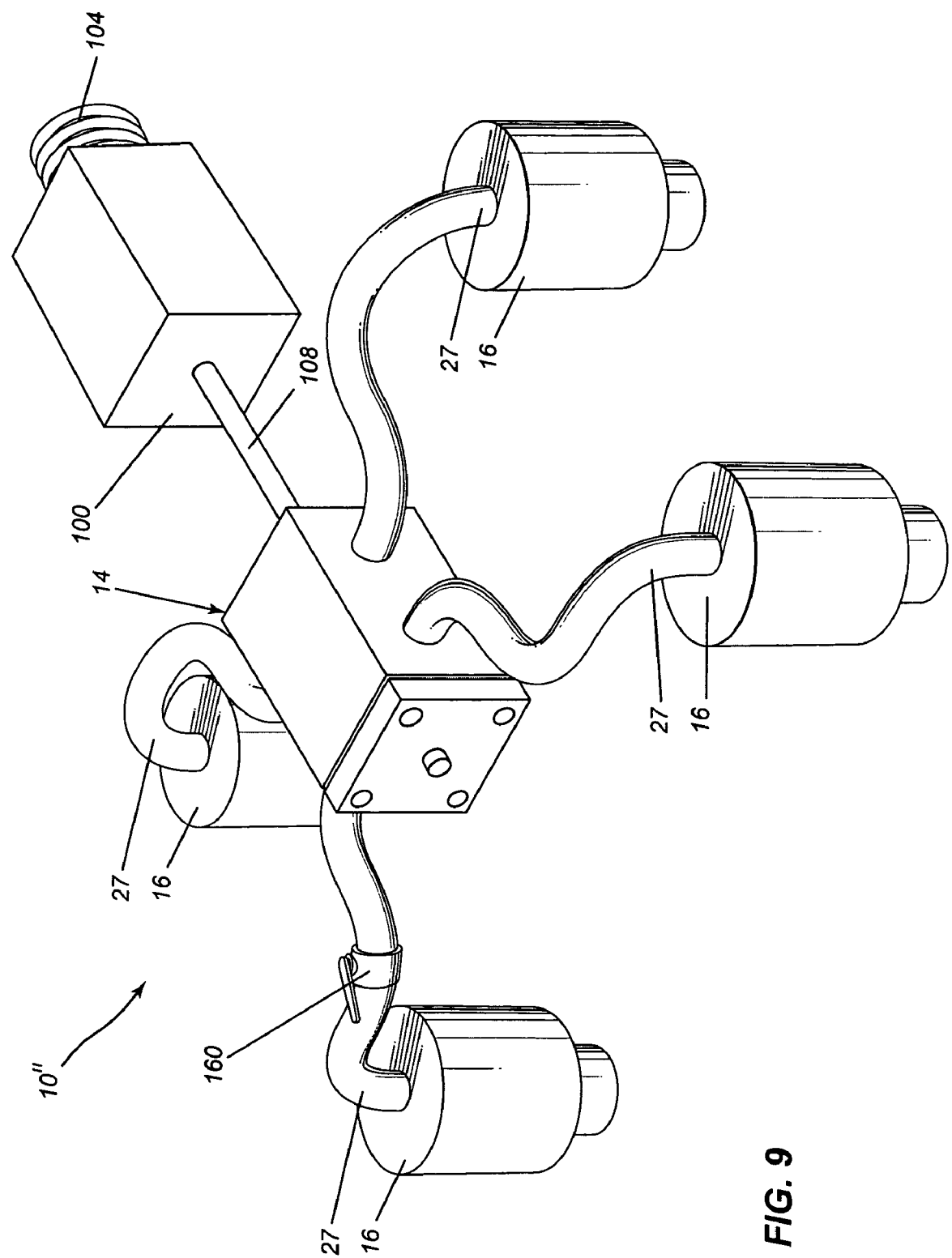
FIG. 9, in a partial perspective view, illustrates a device for adjusting the attitude of an object in accordance with another alternative embodiment of the invention.
Figure 10:
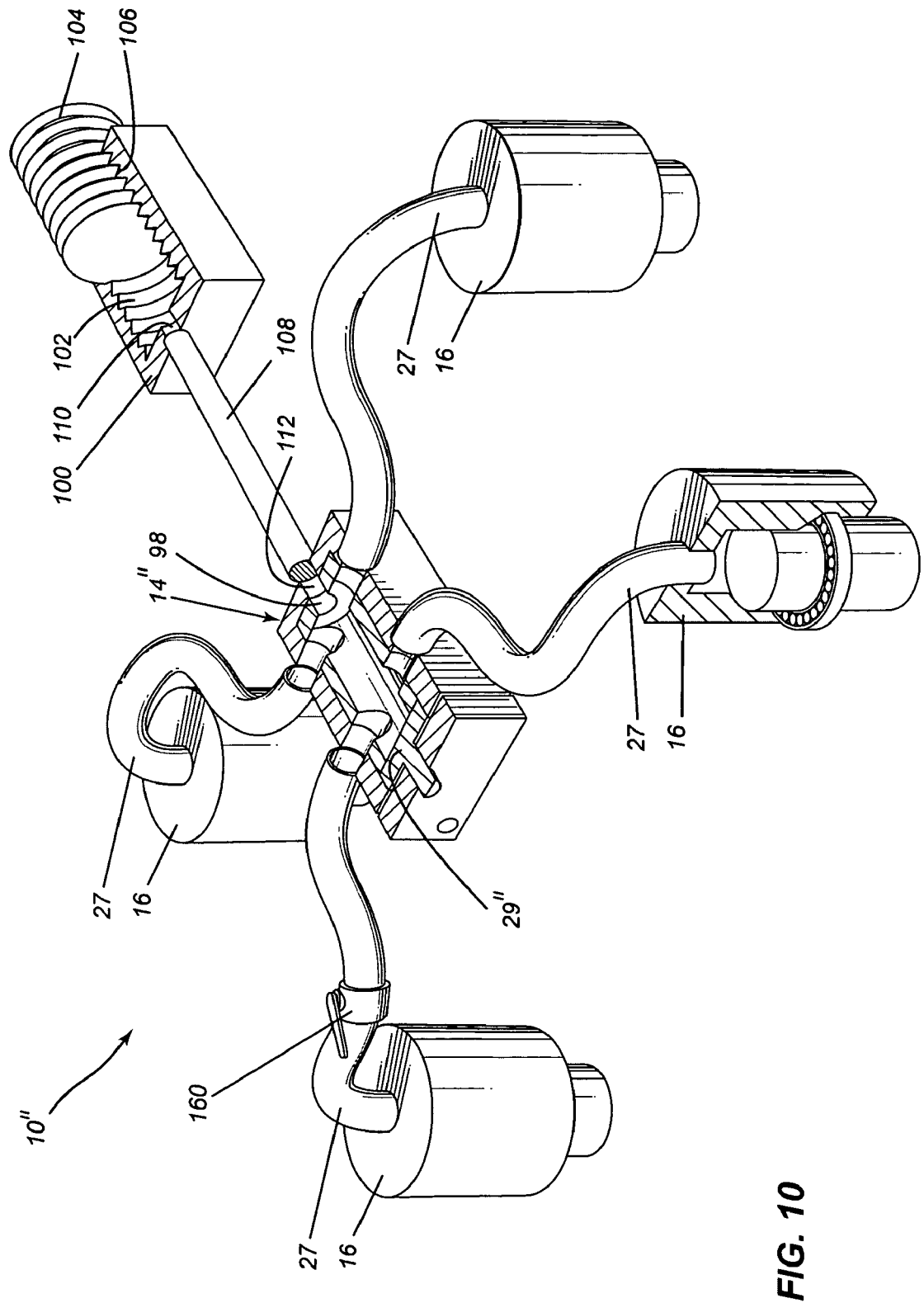
FIG. 10, in a perspective partial cross sectional view, illustrates the device of FIG. 9 with a valve thereof in an open configuration.

FIGS. 9 and 10 illustrate another alternative device 10" similar to the device 10 illustrated in FIGS. 2-5. In the device 10", an alternative primary valve 14" includes an alternative flow controlling member 29". The flow controlling member 29" is similar to the flow controlling member 29, except that it includes a fluid filling aperture 98 for allowing the addition of fluid into the device 10" and the removal of fluid out from the device 10".

As better shown in FIG. 10, the device 10" includes an accumulator 100 defining an accumulator cavity 102 therewithin. The accumulator cavity 102 is at least in part threaded and defines a first accumulator cavity aperture 106. The accumulator cavity 102 engages an at least partially threaded accumulator plug 104 inserted through the first accumulator cavity aperture 106. Threading and unthreading the accumulator plug 104 varies a volume available to receive a fluid within the accumulator cavity 102.

The accumulator cavity 102 is in fluid communication with the valve body chamber 19 through the fluid filling aperture 98. To that effect, an accumulator-to-valve tube 108 connects to a second accumulator cavity aperture 110 in fluid communication with the accumulator cavity 102 and to a fluid admission aperture 112 in fluid communication with the fluid filling aperture 98. The second accumulator cavity aperture 110 and the fluid admission aperture 112 extend respectively from the accumulator-to-valve tube 108 to the accumulator cavity 102 and into the valve internal chamber 29".

In use, when the primary valve 14 is in the open configuration, rotating the accumulator plug 104 relatively to the accumulator cavity 102 translates the accumulator plug 104 with respect to the accumulator cavity 102 and thereby allows for variations in quantity of fluid present within the primary valve 14 and the supports 16. When the volume available to the fluid within the accumulator cavity 102 is reduced, the supports 16 each receive an additional quantity of fluid. When the volume available to the fluid within the accumulator cavity 102 is increased, the supports 16 each release fluid. This causes the pistons 20 to move within the sleeves 44 and thereby adjusts globally a height at which the object 12 is supported with respect to a support surface.

When the primary valve 14 is in the closed configuration, the accumulator plug 104 is not able to cause a flow of fluid into and out from the supports 16. Therefore, in the closed configuration, the primary valve 14 also locks the height of the object 12 above the ground surface.

Figure 11:
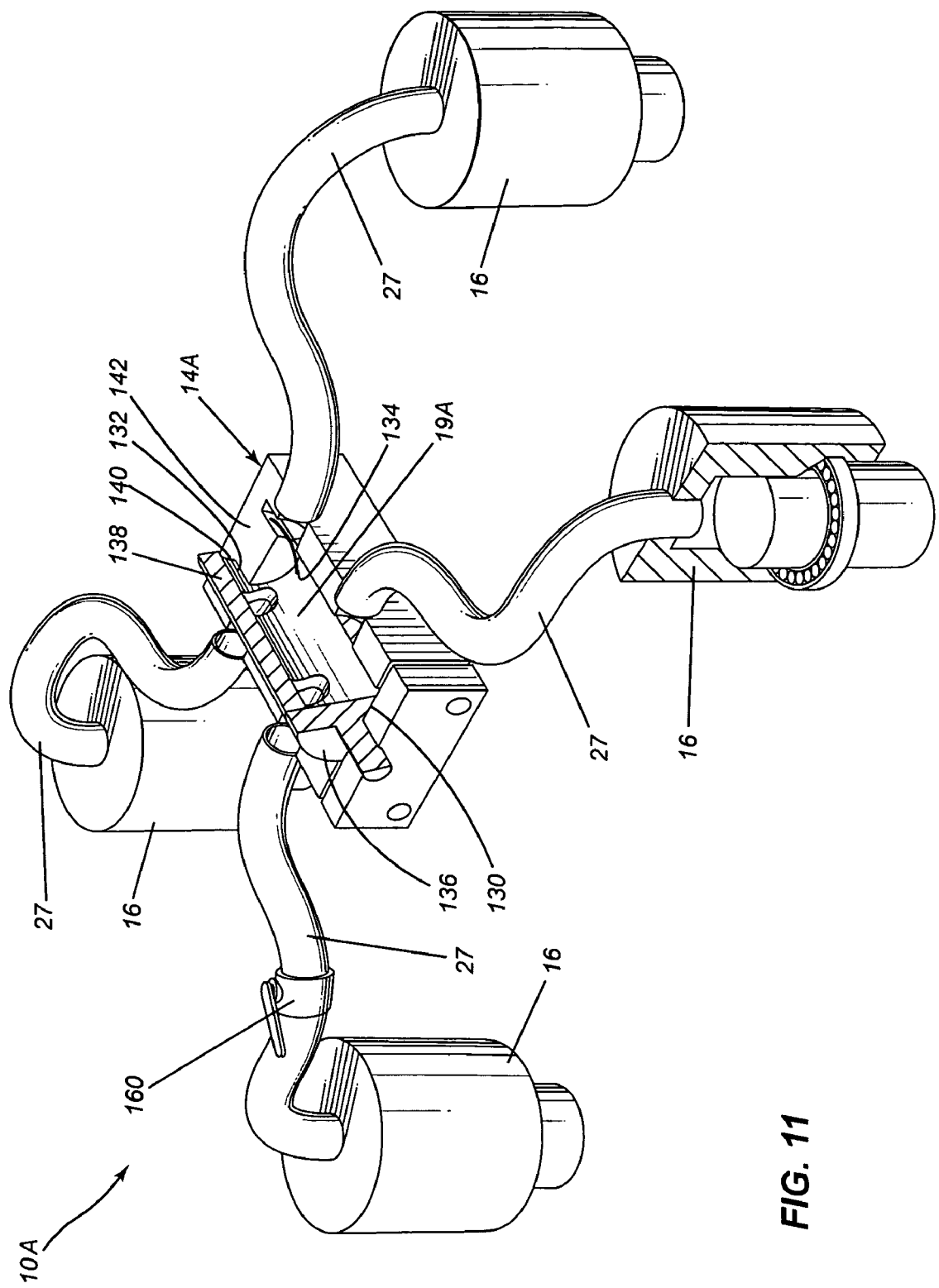
FIG. 11, in a perspective partial cross sectional view, illustrates a device for adjusting the attitude of an object in accordance with yet another alternative embodiment of the invention.

FIG. 11 illustrates yet another an alternative device 10A. The device 10A is similar to the device 10 except that the device 10A includes an alternative primary valve 14A. The primary valve 14A includes a valve internal chamber 19A defining a longitudinal axis. The valve internal chamber 19A includes an internal chamber first end 130 and an internal chamber second end 132 substantially longitudinally opposed to the internal chamber first end 130.

The valve internal chamber 19A includes a substantially annular recess 134 located substantially adjacent the internal chamber second end 132. The annular recess defining a recess plane extending thereacross, the recess plane being substantially perpendicular to the longitudinal axis.

The flow controlling member 29A includes a flow controlling member end wall 136, a flow controlling member peripheral wall 138 extending substantially longitudinally from the flow controlling member and a flow controlling member aperture 140 located substantially longitudinally opposed to the flow controlling member end wall 136. The flow controlling member peripheral wall 138 is located at least in part into the annular recess 134.

In other words, the primary valve 14A defines a substantially cylindrical protrusion 142 extending into the valve internal chamber 19A. The cylindrical protrusion 142 is received into the flow controlling member aperture 140.

Figure 12:
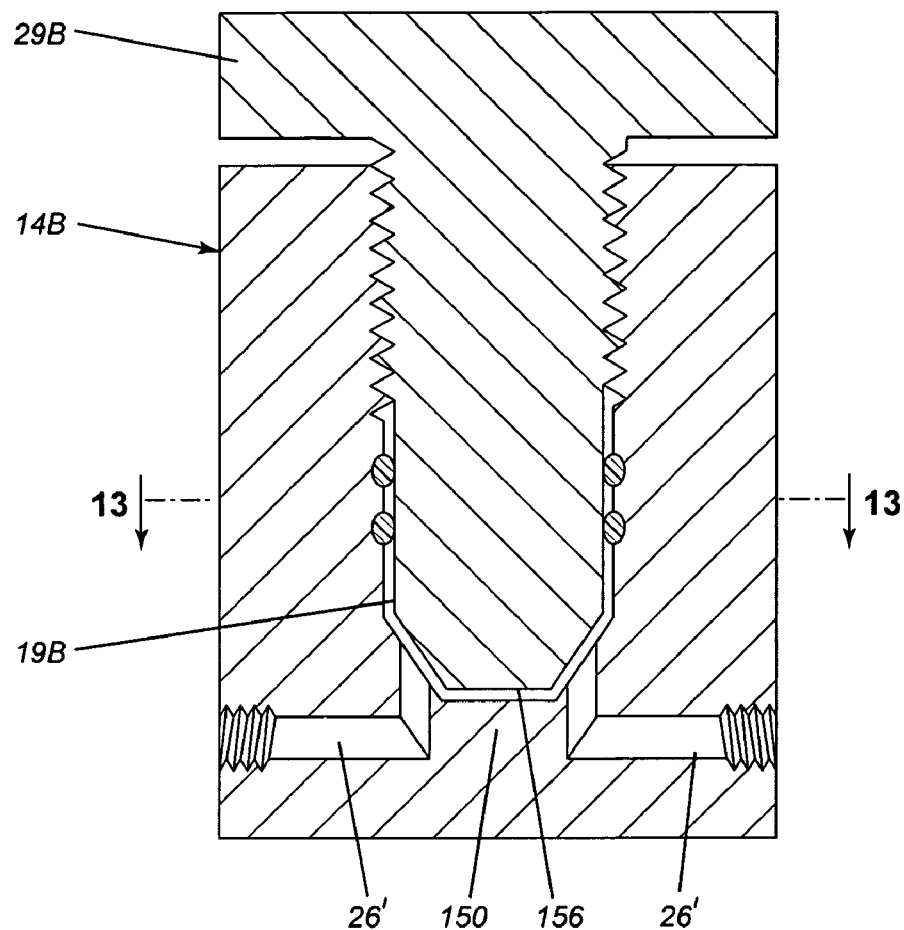
FIG. 12, in a side elevation cross-sectional view, illustrates a valve of a device for adjusting the attitude of an object in accordance with yet another alternative embodiment of the invention.
Figure 13:
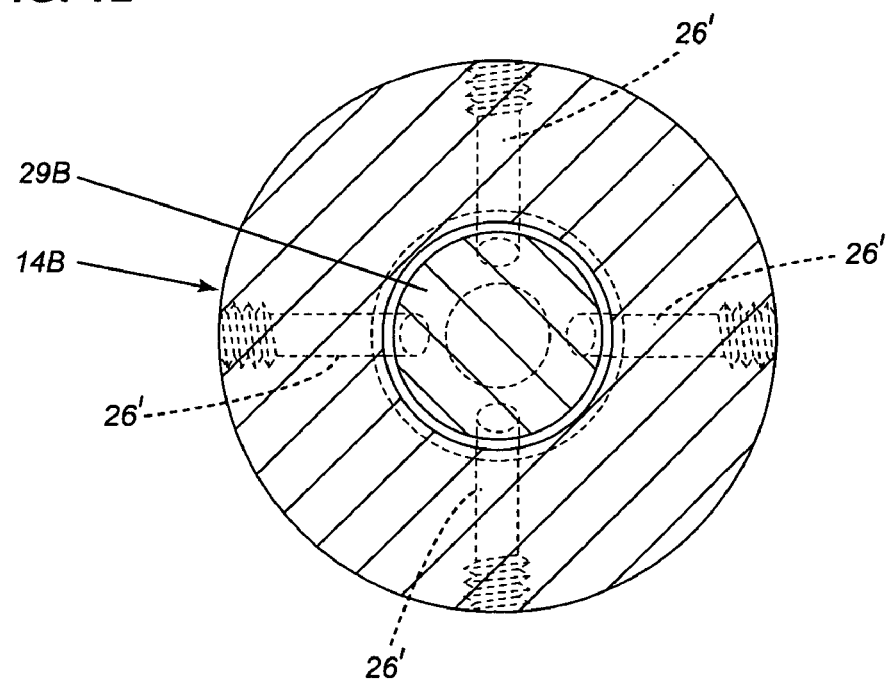
FIG. 13, in a top plan cross-sectional view across the line 13-13 of FIG. 12, illustrates the valve of FIG. 12.

FIGS. 12 and 13 illustrate another alternative primary valve 14B similar to the primary valve 10'. The primary valve 14B includes a valve internal chamber 19B defining a longitudinal axis. In the valve internal chamber 19', a substantially conical recess 152 receives a substantially conical protrusion 154 formed into the flow controlling member 29' when the flow controlling member 29' is in the closed position. However, in the primary valve 14B, a substantially longitudinally extending protrusion 150 engages an end surface 156 of an alternative flow controlling member 29B when the flow controlling member 29B is in the closed position. This engagement prevents the fluid from moving between the support chambers 46 as the valve body apertures 26' are then blocked by the flow controlling member 29B.

In some embodiments of the invention, a secondary valve 160 is provided between the primary valve 14, 14', 14", 14A and 14B and at least one of the support chambers 46 for selectively allowing and preventing the fluid to flow between the support chamber 46 and the primary valve 14, 14', 14", 14A and 14B. However, in other embodiments of the invention, the secondary valve 160 is not present. Also, it is within the scope of the invention to have a respective secondary valve 160 between either only some of the support chambers 46 and the primary valve 14, 14', 14", 14A and 14B, or between all the support chambers 46 and the primary valve 14, 14', 14", 14A and 14B.

Although the present invention has been described hereinabove by way of preferred embodiments thereof, it can be modified, without departing from the spirit and nature of the subject invention as defined in the appended claims.

What is claimed is:

1. A device for adjusting the attitude of an object and supporting the object onto a ground surface, said device being usable with a fluid, said device comprising:

at least three supports, each support being provided for supporting at least in part the object, each support including a sleeve;

a piston mounted for reciprocating movement within said sleeve so as to be movable between a retracted position and an extended position;

said sleeve and said piston together defining a support chamber, said support chamber being fillable with said fluid, said support chamber defining a support chamber volume, said support chamber volume being larger when said piston is in said extended position than when said piston is in said retracted position;

at least one of said sleeve and said piston defining a ground contacting surface for supporting said support onto the ground surface; and a primary valve in fluid communication with said at least three supports, said primary valve being operable between an open configuration and a closed configuration, wherein in said open configuration, said primary valve allows a flow of the fluid through said valve so that the fluid is allowed to flow simultaneously between said support chambers of said at least three supports, and in said closed configuration, said primary valve prevents the fluid from moving through said valve so that the fluid is prevented from moving between said support chambers of said at least three supports, said primary valve including a valve body having a valve internal chamber, said valve internal chamber being in fluid communication with said support chambers; and a flow controlling member mounted at least in part into said valve internal chamber, said flow controlling member including a flow controlling member outer surface, a flow controlling member chamber located thereinto and at least three flow controlling apertures extending between said flow controlling member outer surface and said flow controlling member chamber;

wherein said flow controlling member is movable between an open position wherein said flow controlling apertures are each in fluid communication with a respective one of said support chambers, thereby allowing the fluid to flow into and out from said flow controlling member chamber, and in said closed position, said flow controlling member prevents said fluid from flowing into and out from said flow controlling member chamber.

2. A device as defined in claim 1, wherein said flow controlling member is rotatably mounted into said valve internal chamber, said flow controlling member being movable between said open and closed positions through a rotation of said flow controlling member with respect to said valve internal chamber.

3. A device as defined in claim 2, wherein
said valve internal chamber is substantially cylindrical;
said valve body defines at least three valve body apertures extending substantially outwardly from said valve internal chamber, each of said valve body. apertures being in fluid communication with a respective one of said support chamber;
said flow controlling member is substantially cylindrical;
said valve body apertures and said flow controlling apertures are positioned such that when said flow controlling member is in said open position, each of said flow controlling apertures is substantially in register with a respective one of said valve body apertures.

4. A device as defined in claim 3, wherein
said valve internal chamber defines a longitudinal axis;
said valve internal chamber includes an internal chamber first end and an internal chamber second end substantially longitudinally opposed to said internal chamber first end;
said valve internal chamber includes a substantially annular recess located substantially adjacent said internal chamber first end, said annular recess defining a recess plane extending thereacross, said recess plane being substantially perpendicular to said longitudinal axis;
said flow controlling member includes a flow controlling member end wall, a flow controlling member peripheral wall extending substantially longitudinally from said flow controlling member and a flow controlling member aperture located substantially longitudinally opposed to said flow controlling member end wall, said flow controlling member peripheral wall being located at least in part into said annular recess.

5. A device as defined in claim 3, wherein said flow controlling member defines a longitudinal axis and includes a flow controlling member first end wall, a flow controlling member second end wall located substantially longitudinally opposed to said flow controlling member first end wall, and a flow controlling member peripheral wall extending therebetween.

6. A device for adjusting the attitude of an object and supporting the object onto a ground surface, said device being usable with a fluid, said device comprising:
at least three supports, each support being provided for supporting at least in part the object, each support including
a sleeve;
a piston mounted for reciprocating movement within said sleeve so as to be movable between a retracted position and an extended position;
said sleeve and said piston together defining a support chamber, said support chamber being fillable with said fluid, said support chamber defining a support chamber volume, said support chamber volume being larger when said piston is in said extended position than when said piston is in said retracted position;
at least one of said sleeve and said piston defining a ground contacting surface for supporting said support onto the ground surface; and
a primary valve in fluid communication with said at least three supports, said primary valve being operable between an open configuration and a closed configuration, wherein in said open configuration, said primary valve allows a flow of the fluid through said valve so that the fluid is allowed to flow simultaneously between said support chambers of said at least three supports, and in said closed configuration, said primary valve prevents the fluid from moving through said valve so that the fluid is prevented from moving between said support chambers of said at least three supports, said primary valve including
a valve body having a valve internal chamber and at least three valve body apertures extending substantially outwardly therefrom, each of said valve body apertures being in fluid communication with a respective one of said support chambers; and
a flow controlling member mounted to said valve body, said flow controlling member being movable between an open position and a closed position, wherein in said open position, said valve body apertures are in fluid communication with said valve internal chamber, and in said closed position, said flow controlling member prevents the fluid to flow between said valve body apertures and said internal chamber.

7. A device as defined in claim 6, wherein in said closed position, said flow controlling member substantially fills said valve internal chamber.

8. A device as defines in claim 6, wherein said valve body includes a controlling member receiving aperture extending from said valve internal chamber, said flow controlling member being at least in part mounted into said controlling member receiving aperture.

9. A device as defines in claim 8, wherein said valve body defines valve body threads and said flow controlling member defines controlling member threads engaging at least in part said valve body threads, said valve body threads and said flow controlling threads being located such that a rotation of said flow controlling member relatively to said valve body causes said flow controlling member to move relatively to said valve internal chamber.

10. A device as defined in claim 1, wherein said primary valve includes a fluid filling aperture for allowing the addition of fluid into said device and the removal of fluid out from said device.

11. A device as defined in claim 10, wherein said fluid filling aperture is in fluid communication with an accumulator fillable with the fluid, said accumulator having a variable volume, wherein varying a volume of said accumulator while said primary valve is in said open configuration allows to vary the total volume of fluid present in said primary valve and said support chambers.

12. A device as defined in claim 1, further comprising a secondary valve provided between said primary valve and at least one of said support chambers for selectively allowing and preventing the fluid to flow between said at least one of said support chambers and said primary valve.

13. A device as defined in claim 1, wherein said ground contacting surface of at least one of said supports is formed by said piston of said at least one of said supports.

14. A device as defined in claim 13, wherein said piston of said at least one of said supports is substantially elongated and defines a piston first end and a substantially longitudinally opposed piston second end, said piston first end being insertable into said sleeve and said ground contacting surface being located substantially adjacent said piston second end.

15. A device as defined in claim 1, further comprising a platform for receiving the object, said platform being supported substantially spaced apart from the ground surface by said at least two supports.

* * * * *